(12) United States Patent
Katikala et al.

(10) Patent No.: US 12,410,954 B2
(45) Date of Patent: Sep. 9, 2025

(54) OIL MANAGEMENT FOR DUAL COMPRESSOR MODULATION

(71) Applicant: Carrier Corporation, Palm Beach Gardens, FL (US)

(72) Inventors: Lok Sudhir Katikala, Telangana (IN); Ashalatha Kapa, Telangana (IN); Ashoka Thimma Reddy, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 350 days.

(21) Appl. No.: 18/083,041

(22) Filed: Dec. 16, 2022

(65) Prior Publication Data

US 2023/0194135 A1    Jun. 22, 2023

Related U.S. Application Data

(60) Provisional application No. 63/291,723, filed on Dec. 20, 2021.

(51) Int. Cl.
*F25B 41/20* (2021.01)
*F25B 31/00* (2006.01)

(52) U.S. Cl.
CPC ............ *F25B 41/20* (2021.01); *F25B 31/002* (2013.01); *F25B 2400/061* (2013.01); *F25B 2400/0751* (2013.01); *F25B 2500/16* (2013.01); *F25B 2600/2515* (2013.01)

(58) Field of Classification Search
CPC .... F25B 31/002; F25B 41/02; F25B 2400/06; F25B 2400/075; F25B 2500/16; F25B 2600/2515; F25B 5/02
See application file for complete search history.

(56) References Cited

U.S. PATENT DOCUMENTS

| | | | |
|---|---|---|---|
| 6,705,112 B1 * | 3/2004 | Kadle | B60H 1/00978 62/196.4 |
| 9,488,400 B2 | 11/2016 | Him et al. | |
| 2005/0092000 A1 * | 5/2005 | Hwang | F25B 31/004 62/468 |

OTHER PUBLICATIONS

Dong et al.; "Oil Management Solutions for Manifolding Scroll Compressors for Refrigeration Systems"; Year: 2014; 11 pages (https://docs.lib.purdue.edu/cgi/viewcontent.cgi?article=3315&context=icec).
Ekren; "Refrigeration System: Capacity Modulation Methods"; Date: Aug. 30, 2017; 23 pages (https://www.intechopen.com/chapters/56669).
Emerson Climate Technologies, Inc.; "Understanding Compressor Modulation in Air Conditioning Applications"; Year: 2014; 60 pages (https://climate.emerson.com/documents/understanding-compressor-modulation-en-us-3844210.pdf).

(Continued)

*Primary Examiner* — Elizabeth J Martin
(74) *Attorney, Agent, or Firm* — CANTOR COLBURN LLP

(57) ABSTRACT

An air conditioning system includes a first compressor and a second compressor arranged in parallel with the first compressor. The first compressor is a first type of compressor and the second compressor is a second type of compressor different from the first type of compressor. A valve is arranged upstream from both the first compressor and the second compressor relative to a flow of a fluid. The valve is operable to selectively supply the fluid to the first compressor, the second compressor, or both the first compressor and the second compressor.

20 Claims, 9 Drawing Sheets

(56) References Cited

OTHER PUBLICATIONS

Hirano et al.; "Development of a High Efficiency Dual Compressor for Air Conditioner"; Year: 2010; 9 pages (https://docs.lib.purdue.edu/cgi/viewcontent.cgi?article=2982&context=icec).
Kuo et al.; "An Investigation of Refrigerant Oil Retention in an Air Conditioning System with Two Inverter Compressors in Parallel"; Year: 2012; 10 pages (https://docs.lib.purdue.edu/cgi/viewcontent.cgi?article=3141&context=icec).
Langer; "Single Stage vs. Two Stage vs. Variable Speed for Heat Pump/Air Conditioner"; Date: Apr. 27, 2022; 9 pages (https://www.pickhvac.com/faq/singal-stage-vs-two-stage-for-heat-pumpac/).

\* cited by examiner

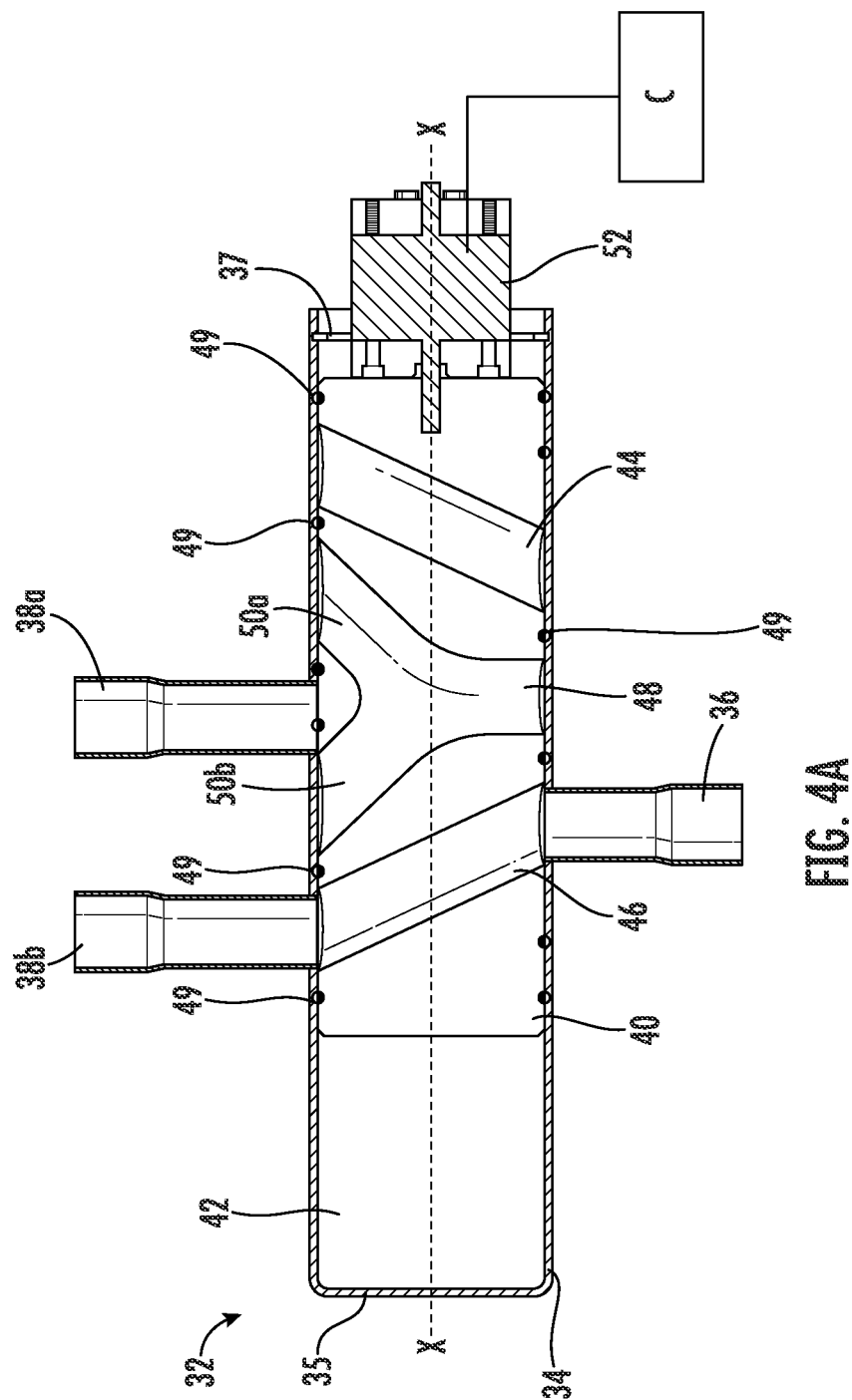

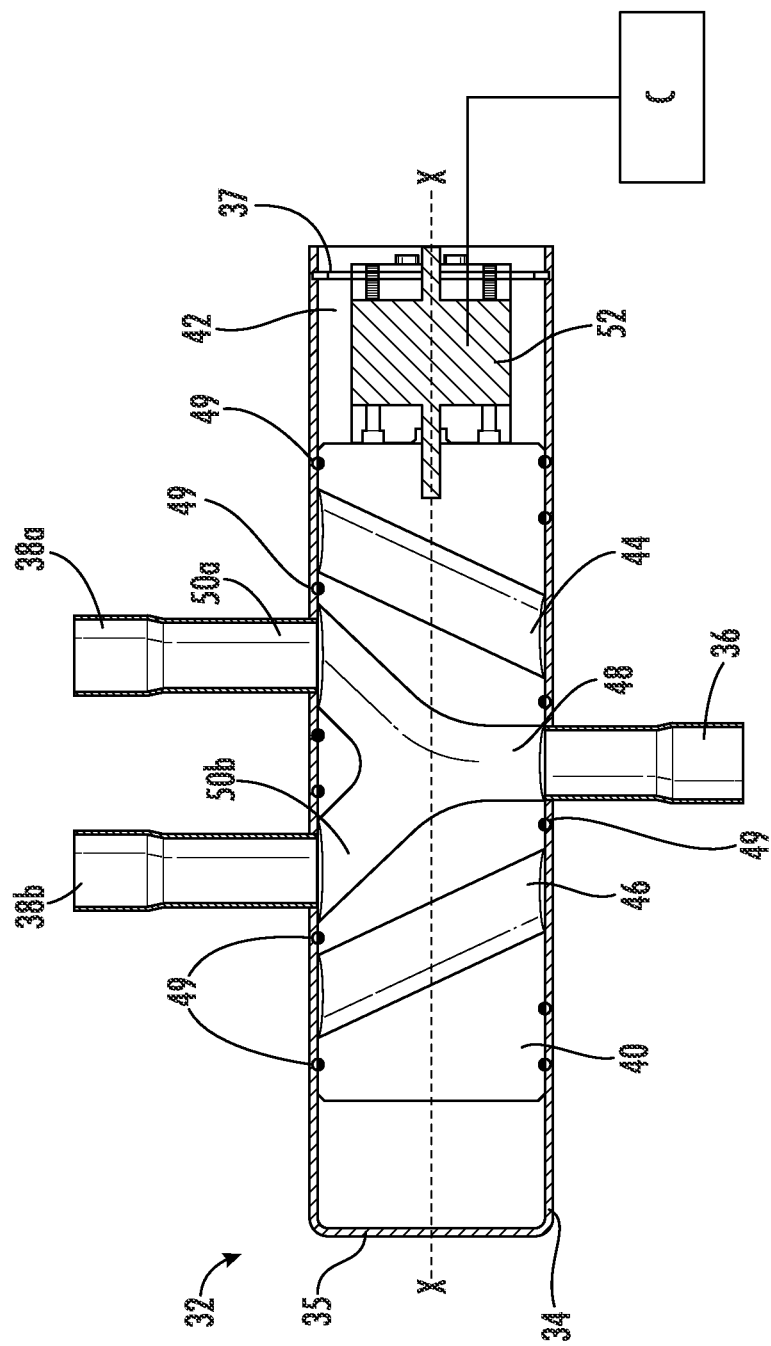

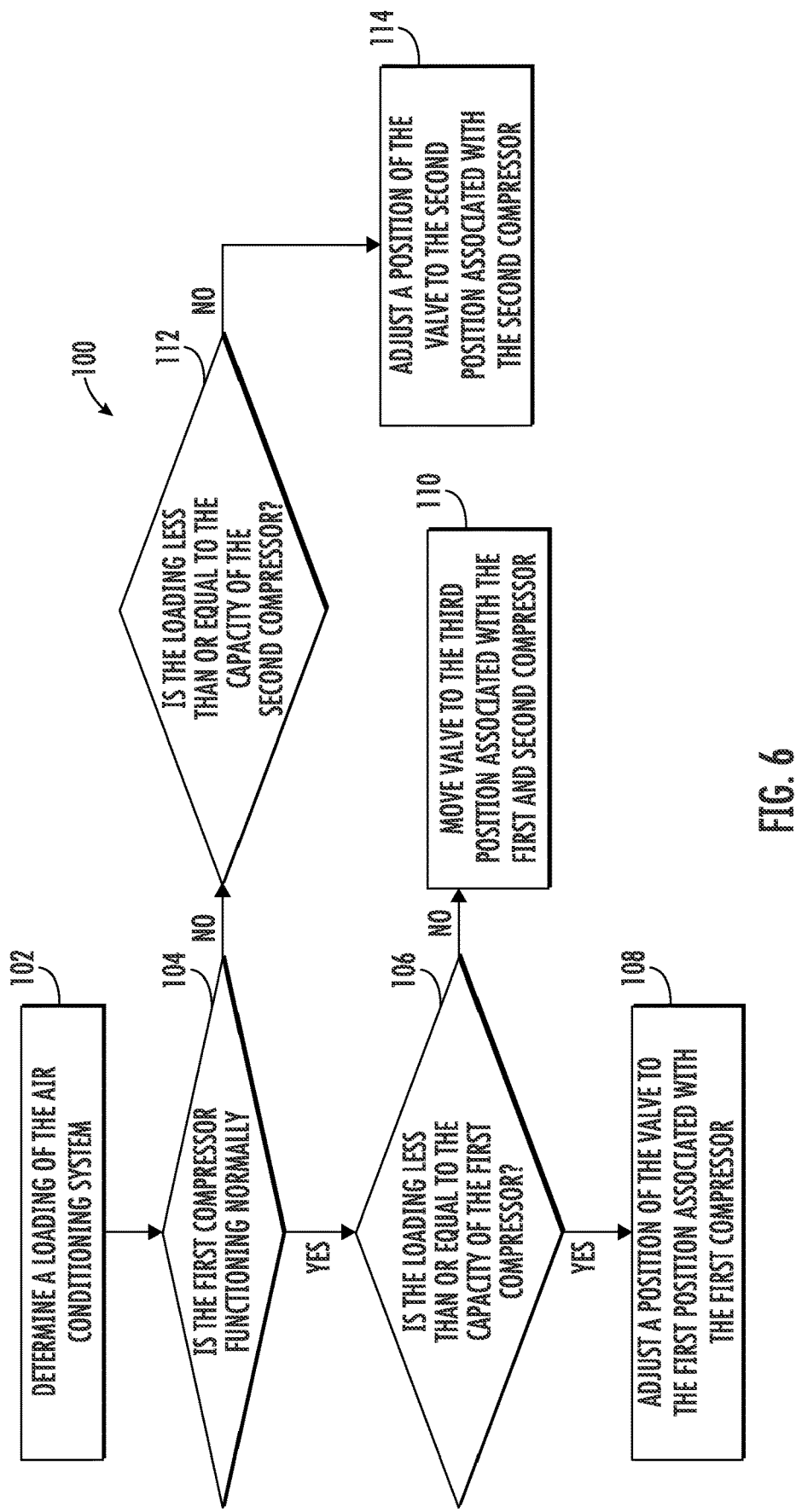

OIL MANAGEMENT FOR DUAL COMPRESSOR MODULATION

CROSS-REFERENCE TO RELATED APPLICATIONS

This application claims the benefit of U.S. Provisional Application No. 63/291,723 filed Dec. 20, 2021, the disclosure of which is incorporated herein by reference in its entirety.

BACKGROUND

Exemplary embodiments pertain to the art of air conditioning systems, and more particularly, to oil management for an air conditioning system having multiple compressors.

As the need for air conditioning systems having higher energy efficiencies and reduced operating costs increases, air conditioning systems having multiple compressors arranged in tandem or parallel are becoming more common. However, oil management for each of the compressors in such a system can be difficult. This is further compounded when different types of compressors are used.

DESCRIPTION

According to an embodiment, an air conditioning system includes a first compressor and a second compressor arranged in parallel with the first compressor. The first compressor is a first type of compressor and the second compressor is a second type of compressor different from the first type of compressor. A valve is arranged upstream from both the first compressor and the second compressor relative to a flow of a fluid. The valve is operable to selectively supply the fluid to the first compressor, the second compressor, or both the first compressor and the second compressor.

In addition to one or more of the features described herein, or as an alternative, further embodiments at least one of the first compressor and the second compressor is a rotary compressor.

In addition to one or more of the features described herein, or as an alternative, further embodiments at least one of the first compressor and the second compressor is a scroll compressor.

In addition to one or more of the features described herein, or as an alternative, further embodiments the first compressor has a first capacity and the second compressor has a second capacity, the second capacity being same or different from the first capacity.

In addition to one or more of the features described herein, or as an alternative, further embodiments the valve includes a valve housing, an inlet conduit, first outlet conduit associated with the first compressor, a second outlet conduit associated with the second compressor, and a valve seat movable within the valve housing between a plurality of positions. The valve seat has a plurality of ports including a first port, a second port, and a third port.

In addition to one or more of the features described herein, or as an alternative, further embodiments the plurality of positions includes a first position in which the fluid is configured to flow from the inlet conduit through the first port to the first outlet conduit, a second position in which the fluid is configured to flow from the inlet conduit through the second port to the second outlet conduit, and a third position in which the fluid is configured to flow from the inlet conduit through the third port to the first outlet conduit and the second outlet conduit.

In addition to one or more of the features described herein, or as an alternative, further embodiments including an accumulator arranged upstream from the first compressor and the second compressor, the valve being integrated into the accumulator.

According to an embodiment, an air conditioning system includes a first compressor and a second compressor arranged in parallel with the first compressor. The first compressor is a high side compressor and the second compressor is a low side compressor. A valve is arranged upstream from both the first compressor and the second compressor relative to a flow of a fluid. The valve is operable to selectively supply the fluid to the first compressor, the second compressor, or both the first compressor and the second compressor.

In addition to one or more of the features described herein, or as an alternative, further embodiments the first compressor is a first type of compressor and the second compressor is a second type of compressor different from the first type of compressor.

In addition to one or more of the features described herein, or as an alternative, further embodiments at least one of the first compressor and the second compressor is a rotary compressor.

In addition to one or more of the features described herein, or as an alternative, further embodiments at least one of the first compressor and the second compressor is a scroll compressor.

In addition to one or more of the features described herein, or as an alternative, further embodiments the first compressor has a first capacity and the second compressor has a second capacity, the second capacity being the same or different from the first capacity.

In addition to one or more of the features described herein, or as an alternative, further embodiments the valve further includes a valve housing, an inlet conduit, a first outlet conduit associated with the first compressor, a second outlet conduit associated with the second compressor, and a valve seat movable within the valve housing between a plurality of positions. The valve seat has a plurality of ports including a first port, a second port, and a third port.

In addition to one or more of the features described herein, or as an alternative, further embodiments the plurality of positions includes a first position in which the fluid is configured to flow from the inlet conduit through the first port to the first outlet conduit, a second position in which the fluid is configured to flow from the inlet conduit through the second port to the second outlet conduit, and a third position in which the fluid is configured to flow from the inlet conduit through the third port to the first outlet conduit and the second outlet conduit.

In addition to one or more of the features described herein, or as an alternative, further embodiments the plurality of positions further comprises at least one offset position in which one of the plurality of ports is only partially aligned with the inlet conduit and at least one of the first outlet conduit and the second outlet conduit.

According to an embodiment, a method of modulating a flow of fluid to a plurality of compressors in an air conditioning system includes determining a loading of the air conditioning system and adjusting a position of a valve to deliver a fluid to at least one of the plurality of compressors in response to the loading of the air conditioning system.

In addition to one or more of the features described herein, or as an alternative, further embodiments the plurality of compressors includes a first compressor having a first capacity and a second compressor having a second capacity, the second capacity being less than the first capacity.

In addition to one or more of the features described herein, or as an alternative, further embodiments adjusting the position of the valve further comprises moving the valve to a first position if the loading of the air conditioning system is less than or equal to the first capacity.

In addition to one or more of the features described herein, or as an alternative, further embodiments adjusting the position of the valve further comprises moving the valve to a second position if first compressor is malfunctioning and the loading of the air conditioning system is less than the second capacity.

In addition to one or more of the features described herein, or as an alternative, further embodiments adjusting the position of the valve further comprises moving the valve to a third position if the loading of the air conditioning system is greater than the first capacity.

BRIEF DESCRIPTION OF THE DRAWINGS

The following descriptions should not be considered limiting in any way. With reference to the accompanying drawings, like elements are numbered alike:

FIG. 4A is a cross-sectional view of a valve in a second position according to an embodiment;

FIG. 5A is a cross-sectional view of a valve in a third position according to an embodiment;

FIG. 6 is a flow diagram of a method of modulating a flow to a plurality of compressors according to an embodiment.

DETAILED DESCRIPTION

A detailed description of one or more embodiments of the disclosed apparatus and method are presented herein by way of exemplification and not limitation with reference to the Figures.

Figure 1:
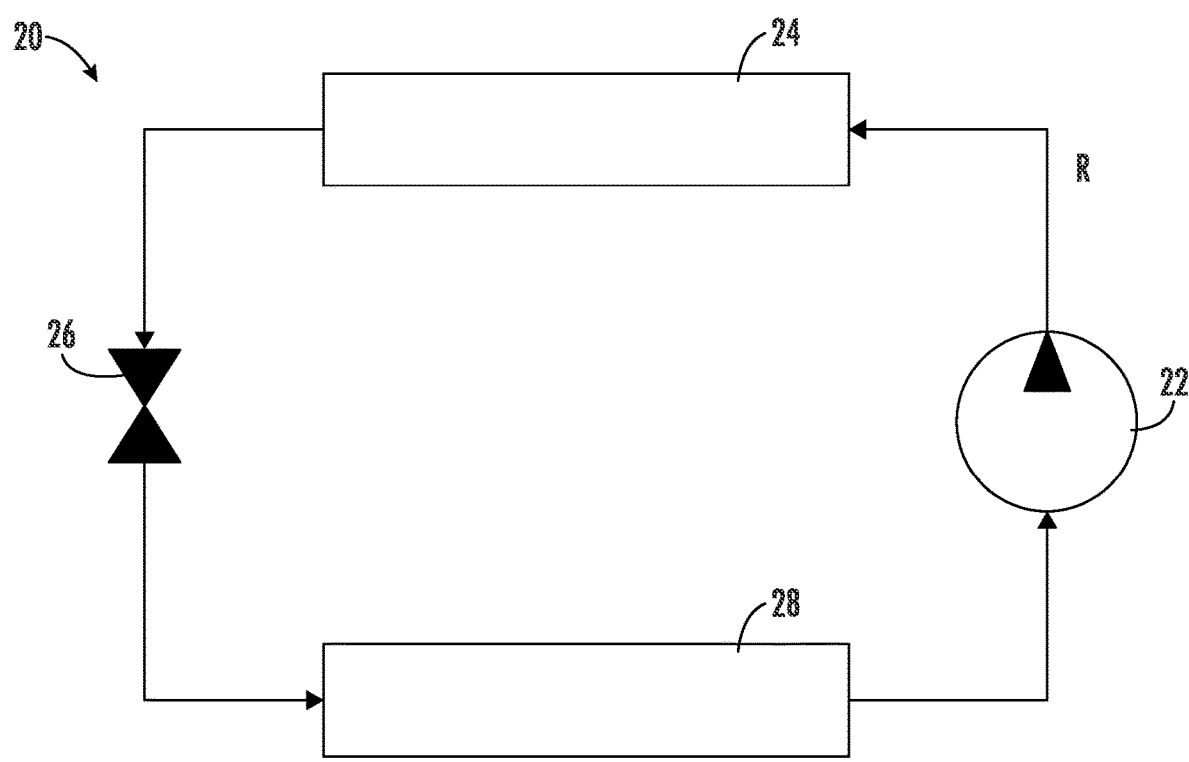
FIG. 1 is a schematic diagram of an exemplary air conditioning system according to an embodiment.

With reference now to FIG. 1, a schematic diagram of an exemplary basic vapor compression cycle of an air conditioning system 20 is illustrated. The air conditioning system 20 includes a compressor 22, a heat rejection heat exchanger (condenser) 24, an expansion device 26, and a heat absorption heat exchanger (evaporator) 28. A fluid, such as a refrigerant for example, is configured to circulate through the vapor compression cycle, such as in a counter-clockwise direction for example. However, it should be understood that the direction of flow may change based on a mode of operation of the air conditioning system.

In the illustrated mode of operation, the compressor 22 receives a refrigerant vapor from the second heat exchanger 28 and compresses it to a high temperature and pressure. The relatively hot refrigerant vapor is then delivered to the heat rejection heat exchanger 24 where it is cooled and condensed to a liquid state via a heat exchange relationship with a cooling medium, such as air or water. The cooled liquid refrigerant flows from the heat rejection heat exchanger 24 to the expansion device 26, such as an expansion valve for example, in which the refrigerant is expanded to a low temperature two phase liquid/vapor state. From the expansion device 26, the refrigerant is provided to the heat absorption heat exchanger 28. Heat is transferred from a secondary medium, such as air for example, to the refrigerant within the heat absorption heat exchanger 28, causing the two phase refrigerant to vaporize. From the heat absorption heat exchanger 28, the low pressure vapor refrigerant returns to the compressor 22 so that the cycle may be repeated.

Figure 2:
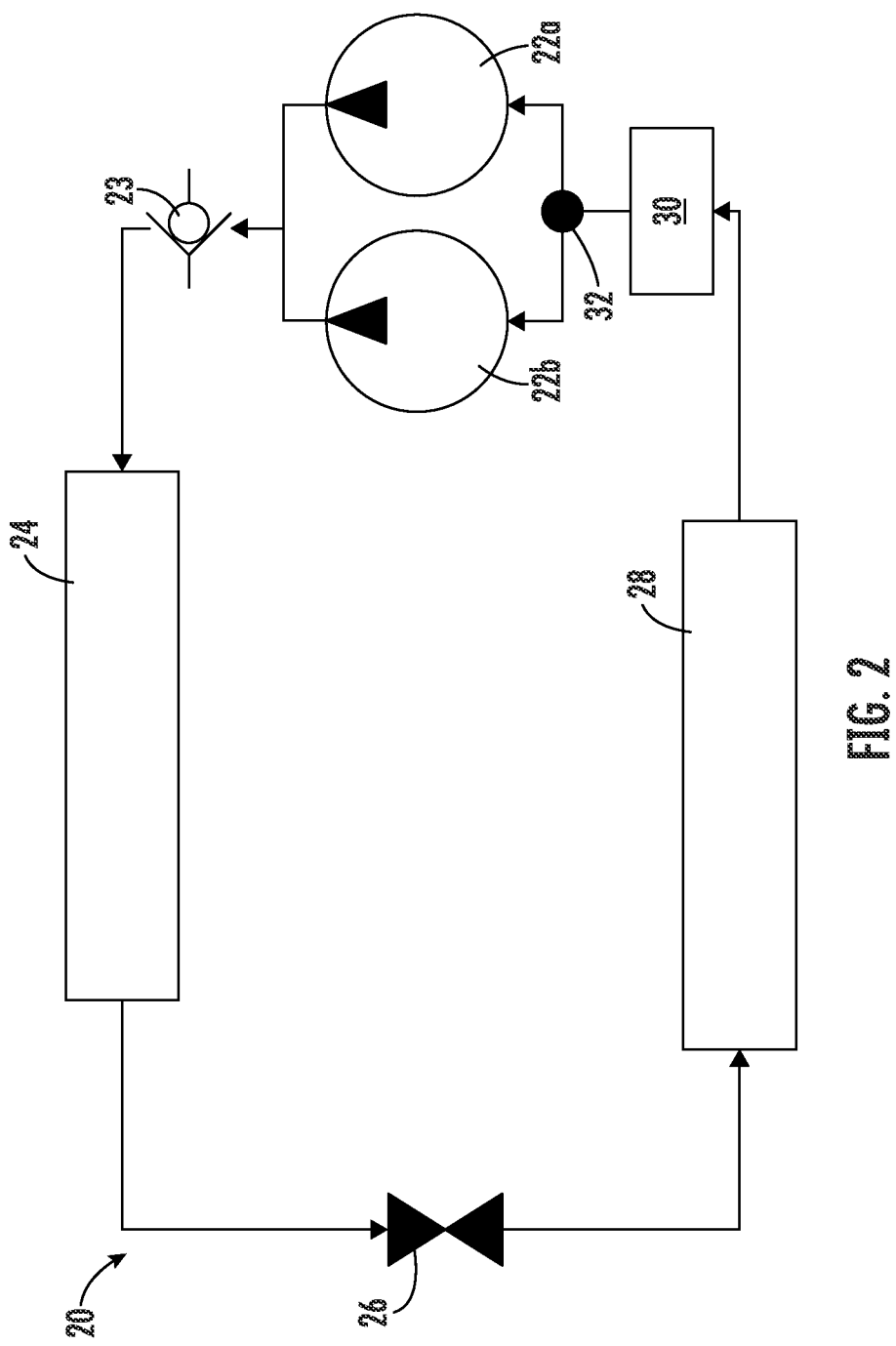
FIG. 2 is a schematic diagram of another air conditioning system according to an embodiment.

With reference now to FIG. 2, in an embodiment, the air conditioning system 20 includes an accumulator 30 arranged between the outlet of the evaporator 28 and the compressor 22. An accumulator is commonly used to prevent damage to the compressor 22 resulting from a sudden surge of liquid refrigerant. In an embodiment, the accumulator 30 functions as a separator such that only gaseous refrigerant is delivered from the accumulator 30 to the compressor 22.

With continued reference to FIG. 2, in an embodiment, the air conditioning system 20 includes a plurality of compressors arranged in parallel downstream from the outlet of the evaporator 28, and in some embodiments, downstream from the outlet of the accumulator 30. In the illustrated, non-limiting embodiment, the plurality of compressors includes a first compressor 22a and a second compressor 22b. However, embodiments having any number of compressors, such as more than two compressors for example, are also contemplated herein. As shown, a check valve 23 may be arranged downstream from each of the one or more compressors 22a, 22b, to prevent the flow of refrigerant from reversing.

In an embodiment, a configuration of the first compressor 22a is different from a configuration of the second compressor 22b. For example, the first compressor 22a and the second compressor 22b may be different types of compressors. In an embodiment the first compressor is a high side compressor, such as a rotary compressor, and the second compressor is a low side compressor, such as a scroll compressor. However, it should be understood that embodiments where the first compressor 22a and the second compressor 22b are the same type of compressor are also contemplated herein. Further, it should be understood that any suitable type of compressor, such as a screw compressor, reciprocating compressor, centrifugal compressor, scroll compressor, rotary compressor or axial-flow compressor is within the scope of the disclosure. Furthermore, one or more of the plurality of compressors 22a, 22b may have a single stage, or alternatively, may include a plurality of stages.

To optimize the functionality of the system 20, the capacity of the first compressor 22a may be different than the capacity of the second compressor 22b. The capacity of the compressors 22a, 22b may be fixed, variable or a combination thereof. By providing two compressors 22a, 22b with different capacities, the fluid R output from the evaporator 28 may be configured to flow entirely through the first compressor 22a, entirely through the second compressor 22b, or through both the first and second compressor 22a, 22b simultaneously, as will be described in more detail below.

Figure 3A:
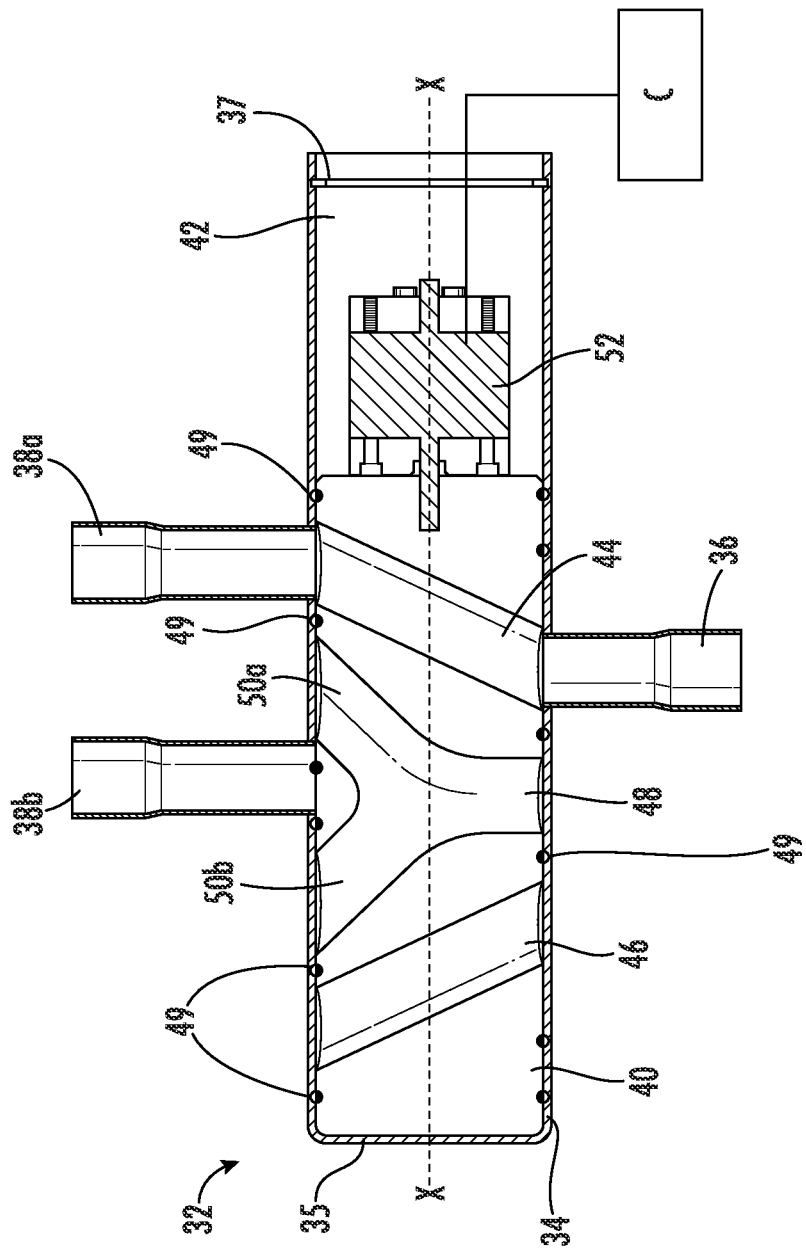
FIG. 3A is a cross-sectional view of a valve in a first position according to an embodiment.

As illustrated schematically at 32 in FIG. 2, a valve is operable to control the flow of fluid, such as gaseous refrigerant and oil for example, provided to the one or more compressors 22a, 22b. Although the valve 32 is illustrated as being arranged downstream from the accumulator 30, embodiments where the valve is integrated into the accumulator 30 are also contemplated herein. With reference now to FIGS. 3-5, an example of a valve 32 suitable for use in the air conditioning system 20 is illustrated in more detail. The valve 32 includes a valve body or housing 34 having an inlet conduit 36 and at least one outlet conduit. In an embodiment, the valve housing 34 is generally cylindrical in shape. However, it should be understood that embodiments where the valve housing 34 is another suitable shape, such as a rectangle for example, are also within the scope of the disclosure.

In the illustrated, non-limiting embodiment, the valve 32 includes as a first outlet conduit 38a and a second outlet conduit 38b separated from one another by a distance. Although the two outlet conduits 38a, 38b are illustrated as being mounted at the same side or surface of the valve housing 34, it should be understood that embodiments where the outlet conduits 38a, 38b are mounted at different sides of the valve housing 34 are also contemplated herein. Further, the inlet conduit 36 may be mounted at the same side or at a different side of the valve housing 34 from the one or more outlet conduits 38a, 38b.

A valve seat 40 is movably mounted within the hollow interior 42 of the valve housing 34. In the illustrated, non-limiting embodiment, the valve seat 40 is configured to translate along an axis X within the valve housing 34 to direct a flow of refrigerant to the one or more downstream compressors 22a, 22b. As shown, axis X is oriented generally horizontally; however, it should be understood that in other embodiments the axis may be arranged vertically, or at another position between horizontal and vertical. Embodiments where the valve seat 40 is movable in another manner, such as where the valve seat 40 is rotatable about the axis within the valve housing 34 for example, are also within the scope of the disclosure.

A plurality of fluidly distinct ports are formed in the valve seat 40. In the illustrated, non-limiting embodiment, the valve seat 40 includes a three ports; a first port 44 fluidly associated with the first compressor 22a, a second port 46 fluidly associated with the second compressor 22b, and a third port 48 fluidly associated with both the first compressor 22a and the second compressor 22b. As shown, the third port 48 separates or splits to form two parallel flow passages 50a, 50b associated with the first compressor 22a and the second compressor 22b, respectively. In an embodiment, a seal, such as an O-ring 49 for example, is arranged about the valve seat 40 adjacent opposing sides of each port 44, 46, 48, to prevent leakage there between.

The valve seat 40 is movable between a plurality of positions. In an embodiment, the valve seat 40 is movable between a first position (FIG. 3A), a second position (FIG. 4A), and a third position (FIG. 5A). In an embodiment, in the first position, the valve seat 40 is arranged adjacent a first end 35 of the valve housing 34. When the valve seat 40 is in the first position, the first port 44 fluidly couples the inlet conduit 36 and the first outlet conduit 38a. Further, the second outlet conduit 38b is offset from each of the plurality of ports 44, 46, 48 such that the second compressor 22b is not in fluid communication with the valve 32. As a result, all of the refrigerant provided to the valve 32 is directed to the first compressor 22a via the first port 44.

In an embodiment, when the valve seat 40 is in the second position, the valve seat 40 is arranged adjacent to a second, opposite end 37 of the valve housing 34. Accordingly, the first position and the second position may define the ends of the path of movement of the valve seat 40. In such embodiments, the maximum stroke of movement of the valve seat 40 may be defined between the first position and the second position.

The second end 37 of the valve housing 34 may be formed by a removable clip. During normal operation of the valve, movement of the valve seat 40 within the valve housing 34 is restricted by the clip. However, the clip may be separated from the valve housing 34 to provide access to and remove the valve seat 40 therefrom for service and/or maintenance.

Similar to the first position, when the valve seat 40 is in the second position, the second port 46 fluidly couples the inlet conduit 36 and the second outlet conduit 38b, and the first outlet conduit 38a is offset from each of the plurality of ports 44, 46, 48 such that the first compressor 22a is not in fluid communication with the valve 32. Accordingly, when the valve seat 40 is in the second position, all of the refrigerant provided to the valve 32 is directed to the second compressor 22b via the second port 46.

In the illustrated, non-limiting embodiment, the third position (FIG. 5A) is defined along the path of movement of the valve seat 40 between the first position and the second position. However, embodiments where the third position is defined at another location along the path of movement of the valve seat are also within the scope of the disclosure. In the third position, the third port 48 fluidly couples the inlet conduit 36 with both the first outlet conduit 38a and the second outlet conduit 38b. As a result, as the refrigerant flows through the third port 48, a first portion of the refrigerant is provided to the first flow passage 50a, and therefore to the first compressor 22a, and a second portion of the refrigerant is provided to the second flow passage 50b, and therefore to the second compressor 22b.

Figure 3B:
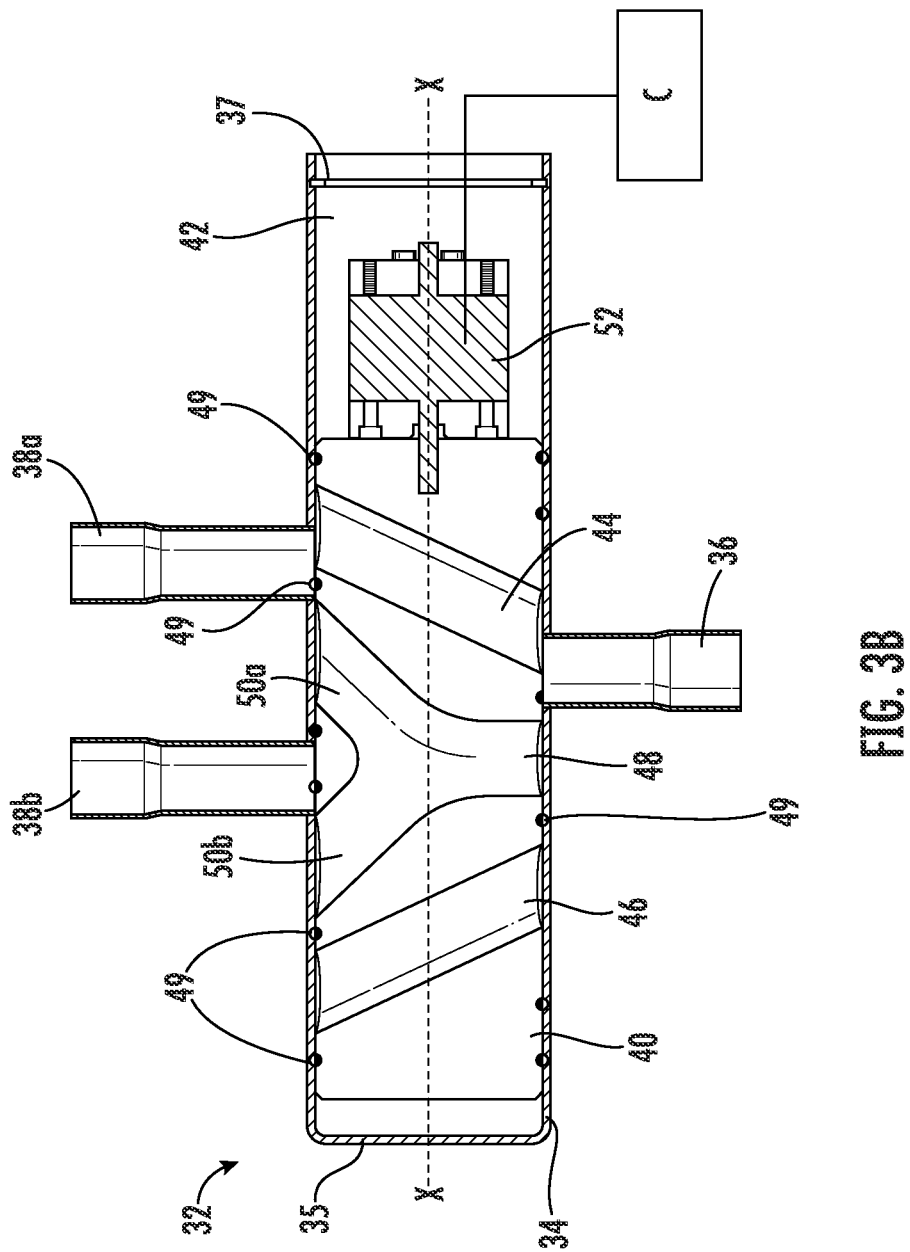
FIG. 3B is a cross-sectional view of a valve slightly offset from a first position according to an embodiment.
Figure 4B:
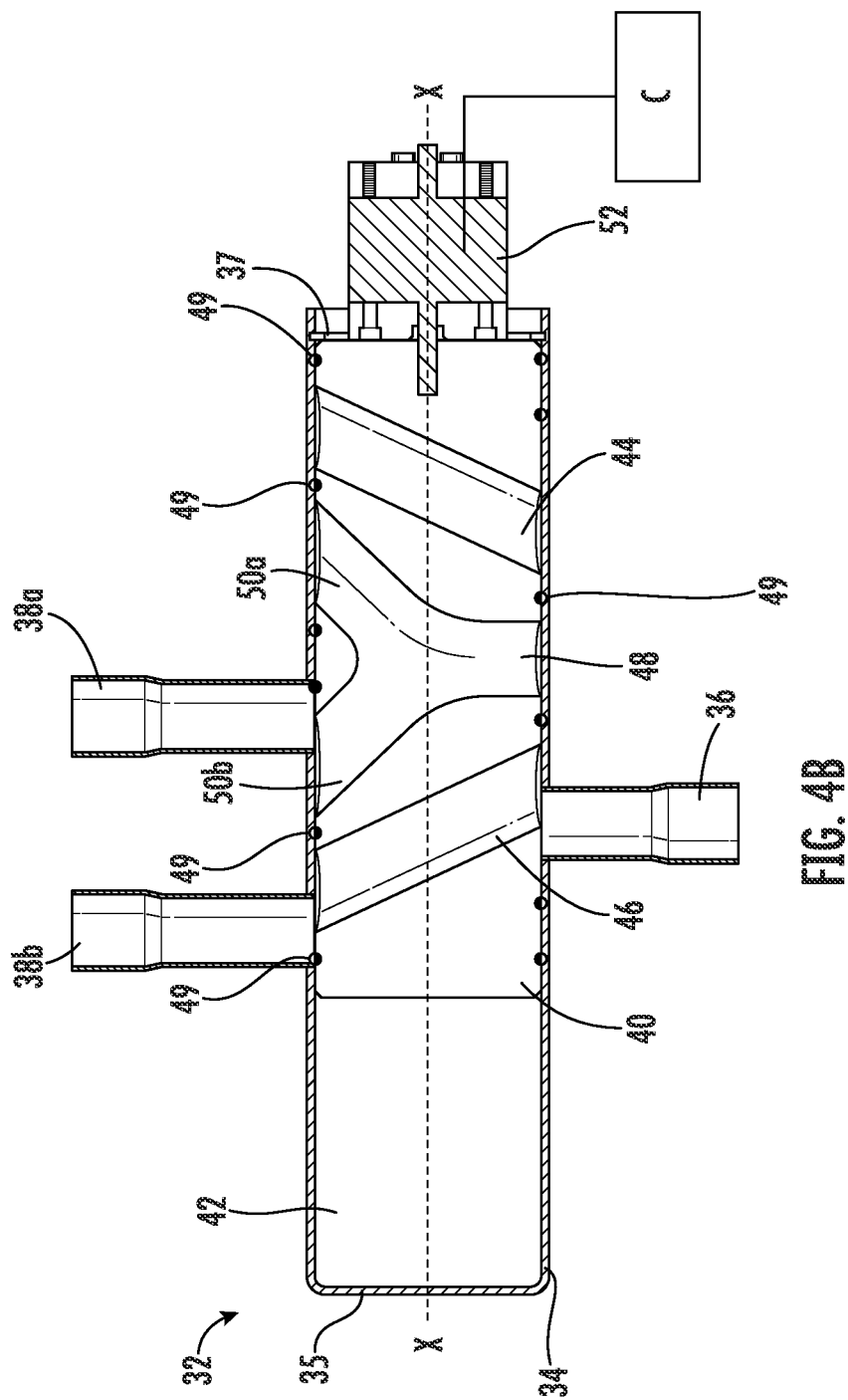
FIG. 4B is a cross-sectional view of a valve slightly offset from a second position according to an embodiment.
Figure 5B:
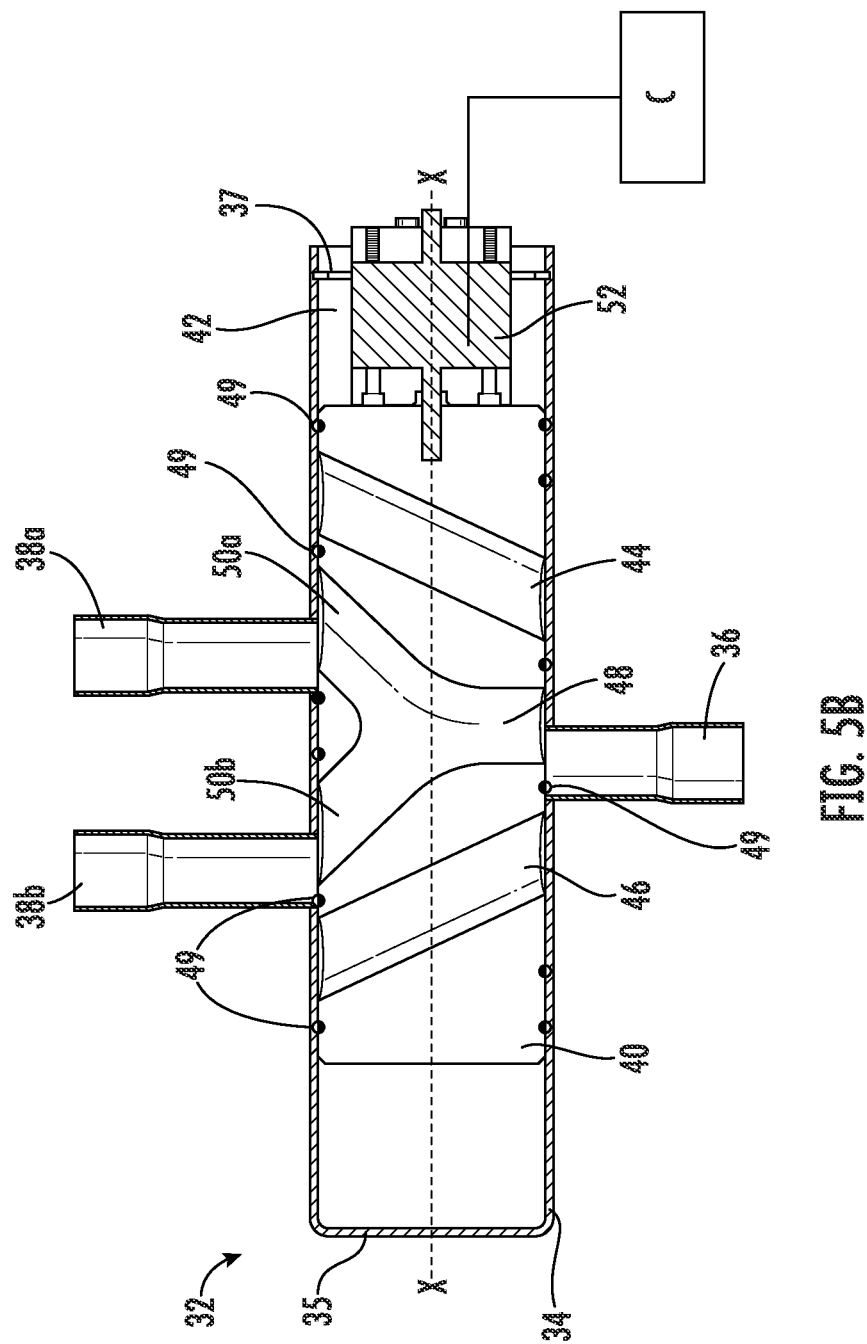
FIG. 5B is a cross-sectional view of a valve slightly offset from a third position according to an embodiment.

Further, it should be understood that the valve seat 40 may be arranged at any intermediate position between the first position and the second position. With reference now to FIGS. 3B, 4B, and 5B, the capacity of the at least one compressor may be adjusted such as to match partial loading conditions by controlling the position of the valve seat 40 to at least one offset position. For example, in embodiments where the refrigerant is provided only to the first compressor 22a but the system 20 has a reduced loading, the valve seat 40 may be slightly offset from the first position, as shown in FIG. 3B. In this offset configuration, only a portion of the first port 44 is in overlapping arrangement with and therefore fluidly connected to the inlet conduit 36 and the first outlet conduit 38a. Similarly, the capacity of the second compressor 22b may be adjusted by arranging the valve seat 40 in a position slightly offset from the second port such that the second port 46 only partially overlaps with the inlet conduit 36 and the second outlet conduit 38b.

Further, the capacity of both the first and second compressors 22a, 22b may be adjusted, in combination, by locating the valve seat 40 in a position offset from the third position. In this offset position, best shown in FIG. 5B, the inlet conduit 36 is only partially aligned with a respective end of the third port 48 and the outlet conduits 38a, 38b are only partially aligned with the first and second flow passages 50a, 50b, respectively. Although the embodiments illustrated in FIGS. 3B, 4B, and 5B illustrate a 50% capacity (half of the port 44, 46, 48 is in overlapping arrangement with the inlet and outlet conduit(s) (36, 38a, 38b), it should be understood that any suitable capacity of the first compressor 22a, the second compressor 22b, or the first and second compressor 22a, 22b can be achieved by varying the offset of the valve seat 40 from the first position, the second position, and the third position, respectively.

A movement mechanism 52, such as a motor or actuator for example, is operably coupled to the valve seat 40 and is configured to drive movement of the valve seat 40 within the valve housing 34. In the illustrated, non-limiting embodiment, the movement mechanism 52 is mounted to an end of the valve seat 40. Accordingly, the movement mechanism 52 is movable between a position external to the valve housing 34 (see FIG. 4A) and a position within the valve housing 34 (see FIG. 3A) during the stroke of movement of the valve seat 40. However, embodiments where the movement mechanism 52 remains within the interior 42 of the valve housing 34 during movement of the valve seat 40 and also embodiments where the movement mechanism 52 remains at an exterior of the valve housing 34 during movement of the valve seat 40 are also within the scope of the disclosure.

Because the first capacity of the first compressor 22a is different than the second capacity of the second compressor 22b, the valve seat 40 may be moved within the valve housing 34 to match the loading on the system 20 as the demand increases. For example, the first compressor 22a may have a three ton capacity and a capacity of the second compressor 22b may be smaller than the capacity of the first compressor 22a, such as a two ton capacity. In an embodiment, a controller C is configured to operate with the movement mechanism 52 to automatically modulate the position of the valve seat 40 in response to determining the loading conditions of the air conditioning system 20. In embodiments where the loading of the system 20 is less than or equal to the capacity of the first compressor 22a, the controller C may be configured to automatically position the valve seat 40 in the first position. In embodiments where the loading of the system 20 is greater than the capacity of the first compressor 22a, the controller C may be configured to automatically position the valve seat 40 in the third position. Similarly, when the load is less than or equal to the capacity of the second compressor 22b & when the first compressor 22a is not functioning due to some failure, the controller C may be configured to automatically position the valve seat 40 in the second position 22b.

With reference to FIG. 6, a flow diagram of a method for modulating a flow of fluid to a plurality of compressors 22a, 22b in an air conditioning system 20 is illustrated. The method 100 includes determining a loading of the air conditioning system, as shown in block 102, and evaluating the functionality of the first compressor 22a in block 104. If the first compressor is functioning normally, the load is then evaluated relative to the capacity of the first compressor 22a. If the load is less than or equal to the capacity of the first compressor 22a (block 106), the valve is moved to the first position (block 108). However, if the load is greater than the capacity of the first compressor 22a, the valve is moved to the third position (block 110). Upon determining that the first compressor 22a is functioning improperly in block 104, the load is then evaluated relative to the capacity of the second compressor 22b. If the load is less than or equal to the second capacity (block 112), the valve is moved to the second position (block 114). Accordingly, when the first compressor 22b is malfunctioning, the valve will be located in the second position (block 114). Similarly, the air conditioning system 20 will operate with the valve in the first position (block 108) when the second compressor 22b is malfunctioning.

To ensure that a sufficient oil level is present within each compressor 22a, 22b, the compressors 22a, 22b may include an oil level indicator of sensor operably coupled to the controller C. In response to the signals from the oil level indicators, the controller C may be configured to operate the movement mechanism 52 to adjust the position of the valve seat 40 to ensure that sufficient oil levels are present within each compressor. Alternatively, or in addition, the controller C could use data tracking through feedback based on an operating condition to evaluate a level of oil within each compressor 22a, 22b, and may adjust the position of the valve seat 40 accordingly.

Inclusion of a valve 32 as described herein in an air conditioning system 20 having multiple compressors will improve the modulation with optimum oil management of the compressors when the system 20 is operated in both full and partial loading conditions. Further, by controlling the flow of oil to the compressors as needed, the life and energy efficiency of the system may be increased.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An air conditioning system comprising:
   a first compressor;
   a second compressor arranged in parallel with the first compressor, wherein the first compressor has a first configuration and the second compressor has a second configuration different from the first configuration; and
   a valve arranged upstream from both the first compressor and the second compressor relative to a flow of a fluid, the valve being operable to selectively supply the fluid to the first compressor, the second compressor, or both the first compressor and the second compressor.

2. The air conditioning system of claim 1, wherein at least one of the first compressor and the second compressor is a rotary compressor.

3. The air conditioning system of claim 1, wherein at least one of the first compressor and the second compressor is a scroll compressor.

4. The air conditioning system of claim 1, wherein the first compressor has a first capacity and the second compressor has a second capacity, the second capacity being different from the first capacity.

5. The air conditioning system of claim 1, wherein the valve further comprises:
a valve housing;
an inlet conduit;
a first outlet conduit associated with the first compressor;
a second outlet conduit associated with the second compressor; and
a valve seat movable within the valve housing between a plurality of positions, the valve seat having a plurality of ports including a first port, a second port, and a third port.

6. The air conditioning system of claim 5, wherein the plurality of positions includes a first position in which the fluid is configured to flow from the inlet conduit through the first port to the first outlet conduit, a second position in which the fluid is configured to flow from the inlet conduit through the second port to the second outlet conduit, and a third position in which the fluid is configured to flow from the inlet conduit through the third port to the first outlet conduit and the second outlet conduit.

7. The air conditioning system of claim 1, further comprising an accumulator arranged upstream from the first compressor and the second compressor, the valve being integrated into the accumulator.

8. An air conditioning system comprising:
a first compressor, wherein the first compressor is a high side compressor;
a second compressor arranged in parallel with the first compressor, wherein the second compressor is a low side compressor; and
a valve arranged upstream from both the first compressor and the second compressor relative to a flow of a fluid, the valve being operable to selectively supply the fluid to the first compressor, the second compressor, or both the first compressor and the second compressor.

9. The air conditioning system of claim 8, wherein the first compressor has a first configuration and the second compressor has a second configuration different from the first configuration.

10. The air conditioning system of claim 9, wherein at least one of the first compressor and the second compressor is a rotary compressor.

11. The air conditioning system of claim 9, wherein at least one of the first compressor and the second compressor is a scroll compressor.

12. The air conditioning system of claim 8, wherein the first compressor has a first capacity and the second compressor has a second capacity, the second capacity being different from the first capacity.

13. The air conditioning system of claim 8, wherein the valve further comprises:
a valve housing;
an inlet conduit;
a first outlet conduit associated with the first compressor;
a second outlet conduit associated with the second compressor; and
a valve seat movable within the valve housing between a plurality of positions, the valve seat having a plurality of ports including a first port, a second port, and a third port.

14. The air conditioning system of claim 13, wherein the plurality of positions includes a first position in which the fluid is configured to flow from the inlet conduit through the first port to the first outlet conduit, a second position in which the fluid is configured to flow from the inlet conduit through the second port to the second outlet conduit, and a third position in which the fluid is configured to flow from the inlet conduit through the third port to the first outlet conduit and the second outlet conduit.

15. The air conditioning system of claim 14, wherein the plurality of positions further comprises at least one offset position in which one of the plurality of ports is only partially aligned with the inlet conduit and at least one of the first outlet conduit and the second outlet conduit.

16. A method of modulating a flow of fluid to a plurality of compressors in an air conditioning system comprising:
determining a loading of the air conditioning system;
adjusting a position of a valve to deliver a fluid to at least one of the plurality of compressors in response to the loading of the air conditioning system.

17. The method of claim 16, wherein the plurality of compressors includes a first compressor having a first capacity and a second compressor having a second capacity, the second capacity being less than the first capacity.

18. The method of claim 17, wherein adjusting the position of the valve further comprises moving the valve to a first position in response to the loading of the air conditioning system is less than or equal to the first capacity.

19. The method of claim 18, wherein adjusting the position of the valve further comprises moving the valve to a second position in response to first compressor is malfunctioning and the loading of the air conditioning system is less than the second capacity.

20. The method of claim 19, wherein adjusting the position of the valve further comprises moving the valve to a third position in response to the loading of the air conditioning system is greater than the first capacity.

* * * * *